US008472613B1

United States Patent
Pan et al.

(10) Patent No.: US 8,472,613 B1
(45) Date of Patent: Jun. 25, 2013

(54) INTELLIGENT AND AUTOMATIC CALLING PROCESS

(75) Inventors: James J. Pan, Cupertino, CA (US); James D. Black, San Francisco, CA (US); Minh Khuc, Fremont, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1320 days.

(21) Appl. No.: 11/556,475

(22) Filed: Nov. 3, 2006

(51) Int. Cl.
*H04M 1/53* (2006.01)

(52) U.S. Cl.
USPC .......................................... 379/355.06; 379/40

(58) Field of Classification Search
USPC ......... 379/266.1, 355.06, 201.01, 40, 355.02, 379/355.05
See application file for complete search history.

(56) References Cited

U.S. PATENT DOCUMENTS

| | | | | |
|---|---|---|---|---|
| 4,882,750 A * | 11/1989 | Henderson et al. | ...... | 379/355.06 |
| 5,333,187 A * | 7/1994 | Hiraiwa et al. | ............... | 379/219 |
| 5,612,993 A * | 3/1997 | Hanaoka et al. | ......... | 379/100.03 |
| 5,732,133 A * | 3/1998 | Mark | ...................... | 379/357.03 |
| 6,223,051 B1 * | 4/2001 | Rikihisa | ........................ | 455/564 |
| 6,914,962 B2 * | 7/2005 | Neary | ......................... | 379/10.02 |
| 6,937,705 B1 * | 8/2005 | Godfrey et al. | ............ | 379/88.18 |
| 7,317,789 B2 * | 1/2008 | Comerford | ................ | 379/88.18 |
| 7,333,472 B2 * | 2/2008 | Yang et al. | ..................... | 370/352 |
| 2004/0037404 A1 * | 2/2004 | Punjabi | ..................... | 379/201.01 |
| 2005/0041793 A1 * | 2/2005 | Fulton et al. | ............ | 379/211.01 |
| 2005/0207548 A1 * | 9/2005 | Moore et al. | ............... | 379/112.1 |

* cited by examiner

*Primary Examiner* — Quynh H Nguyen
*Assistant Examiner* — Oleg Asanbayev

(57) ABSTRACT

Ways for facilitating an automated calling process are described. An embodiment includes receiving a start indication to start recording events associated with a call process, starting a timing reference, receiving data provided by a user, storing information suitable to reproduce the received data based on the timing reference, and repeating the receiving step and the storing step until a stop indication to stop recording events is received. Redialing can occur without user intervention by retrieving a first indication of an information-providing event associated with a dialing process, providing data to satisfy the information-providing event, determining whether a subsequent information-providing event is to be expected, waiting for a correct time or for a prompt to provide additional data to satisfy the subsequent information-providing event, providing additional data to satisfy the subsequent information-providing event, and without user interaction, repeating the determining, waiting, and providing steps until the call is connected or until there is no additional data to provide.

16 Claims, 6 Drawing Sheets

INTELLIGENT AND AUTOMATIC CALLING PROCESS

INTRODUCTION

Calling people or businesses has become more complicated today than it was in the past. In many situations, a caller is greeted with a phone tree or a request for user input in the form of a voice response or other type of response. Thus, traditional unintelligent redial processes are inept at facilitating a calling process that contemplates the automatic provision of data or responses to prompts without user intervention.

SUMMARY

The present invention is defined by the claims below. The present invention has several practical applications in the technical arts including automating a dialing process that includes automatically responding to prompts and the like without user interaction. Moreover, the dropping of a call may be automatically detected, and a redial process may be automatically run so as to reconnect with the disconnected party without user intervention.

In a first illustrative aspect, an embodiment of the present invention includes receiving a start indication to start recording events associated with a call process; starting a timing reference; receiving data provided by a user; storing information suitable to reproduce the received data based on the timing reference; and repeating the receiving step and the storing step until an indication to stop recording events is received.

In another illustrative aspect, an embodiment of the present invention includes receiving an indication to begin a dialing process; retrieving a first indication of an information-providing event associated with a dialing process; providing data to satisfy the information-providing event; determining whether a subsequent information-providing event is to be expected; waiting for a correct time to provide additional data to satisfy the subsequent information-providing event; providing additional data to satisfy the subsequent information-providing event; and without user interaction, repeating the determining, waiting, and providing steps until the call is connected or until there is no additional data to provide.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Combinations of the above are included within the scope of computer-readable media.

Figure 1:
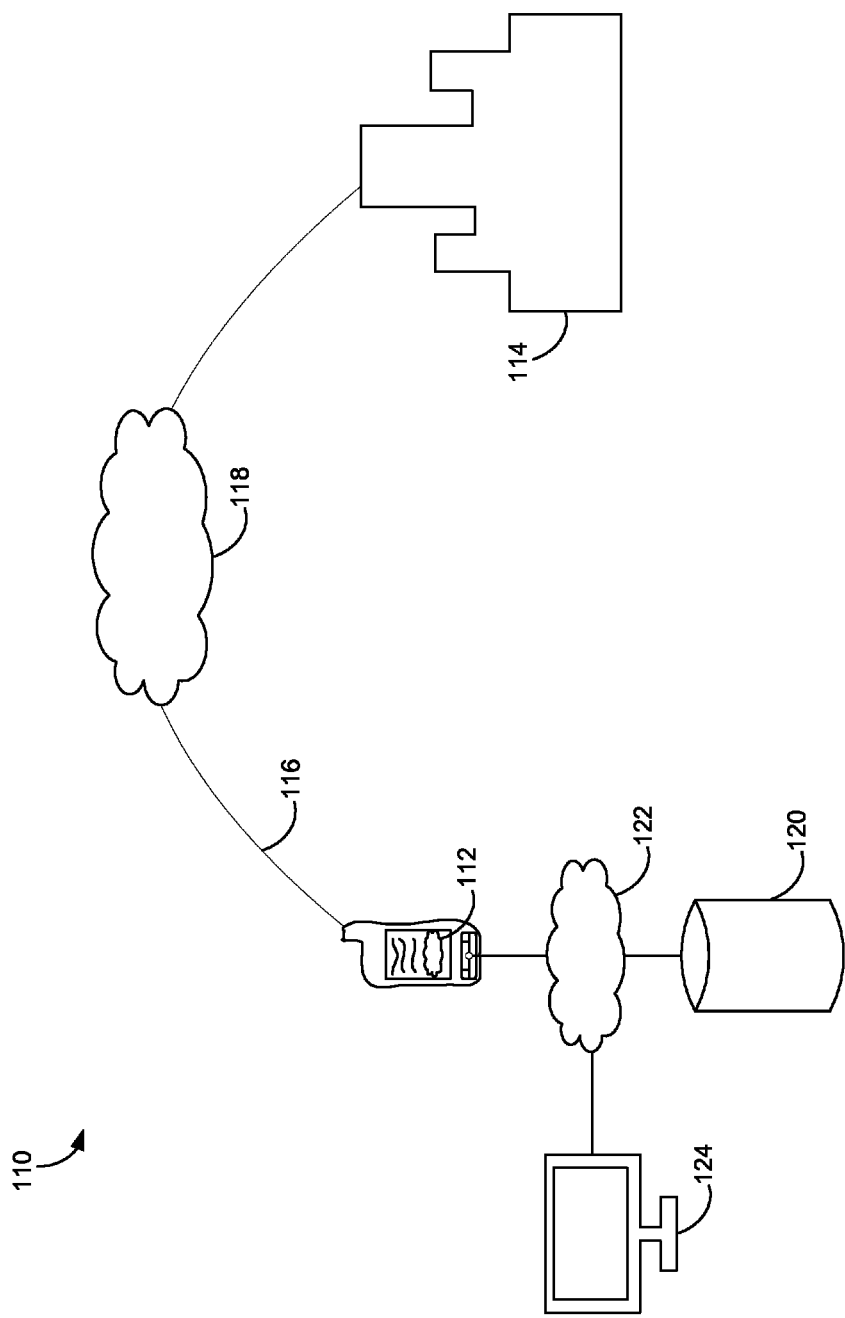
FIG. 1 depicts an illustrative operating environment suitable for practicing an embodiment of the present invention.

FIG. 1 depicts an illustrative operating environment suitable for practicing an embodiment of the present invention, and is referenced generally by the numeral 110. In the illustrative embodiment shown, a first communications device 112 communicates with a second communications device, which is illustratively represented by numeral 114 (a called entity). Communications device 112 will be referred to herein variously as a phone, mobile phone, computer, and may be any communications device capable of establishing a telephonic communications link with another entity such as entity 114. In one embodiment, a communications pathway 116 (wired or wireless) is established through one or more networks, which are represented by numeral 118. Communications device 112 is coupled to a database 120 through a network represented by numeral 122 (which may be the same network as 118 or a different network). A computer 124 may also access database 120.

As will be explained below, communications device 112 can be used to facilitate a method for automatically conducting a call process. The call process may be a process of storing information associated with making a future call or may be a process for connecting a call to one or more entities, collectively represented by numeral 114.

A method for conducting a call can be learned intelligently according to an embodiment of the present invention. That is, a redial process may be able to be programmed and stored either in communications device 112 locally and/or remotely in another storage device such as data store 120. In one embodiment, the information associated with facilitating a call process is stored in a file, which will be referred to herein as a trace file. In alternative embodiments, the information associated with facilitating a call process may be stored in an alternative form, such as a text or ASCII file.

In some embodiments, communications device 112 runs a local application that includes the logic associated with facilitating a call process. In another embodiment, communications device 112 operates as a client of another device, wherein the other device includes the logic for facilitating a call process. Illustrative alternative locations of the logic include computer 124, data base 120, or other devices not shown but understood to one of ordinary skill in the art.

As previously mentioned, one aspect of the present invention includes a recording feature that records inputs and responses to stimuli associated with placing a call so that those inputs can be later recalled to automatically place a call without user intervention even though user intervention would otherwise normally be necessary. More information than just dialed digits can be provided. For example, clips of voice recordings can be provided. In instances where a video call is made, clips of video or data associated with a picture may also be provided.

In this way, calls to phone trees or any entity that utilizes some sort of voice routing features before directing a call to an actual live human being can be conducted by using a method according to an embodiment of the present invention. For example, if entity 114 employs a simple phone tree wherein the first option is to obtain driving directions, the second option is to obtain business hours, and the third option is to speak with a live operator, and such third option is reached by pressing the numeral "3" on one's keypad or keyboard, then an embodiment of the current invention would allow such a call to be placed automatically by dialing a number, and then by providing the desired input at the desired time without user intervention.

In one embodiment, time is tracked from the beginning of the call and user input is sequenced according to the starting point of a clock or some other time-measuring device. In this embodiment, less logic would be necessary to facilitate a dialing process because previously recorded user input would be provided at different times according to when they were previously recorded.

In another embodiment, user input is recorded based on stimuli received from another entity, such as entity 114. In such an embodiment, an initial set of digits may be initially recorded. But then the present invention would monitor a stimulus received to determine when it starts and when it ends, and store a response to the stimulus but not associate it with a fixed time per say. It may be the case that each time a call is made, the time to provide the stimulus is not fixed. In this embodiment, efficiencies can be reaped by not having to store a long stream of silence or audio coupled with dialed digits. Rather, indications of data associated with providing responses to the different stimuli can be utilized.

For example, if this embodiment were provided in connection with the previously explained example, then a first set of dialed digits may be stored in the first location, and then a second location may store an indication of an amount of time to wait. For example, a second storage location may indicate 18 seconds should be waited. Then, data can be retrieved from a third-storage location (such as a field in an array or database or spreadsheet, etc.) and provided. Thus after the prescribed duration lapses, the data associated with that stimulus is provided. In this case, an indication of a dialed digit of the numeral "3."

In still another embodiment, the present invention can determine when a stimulus has occurred. For example, in such an embodiment, when the communications device 112 attempts to make a connection, it does so by automatically providing a first set of dialed digits, and then monitoring a communications line to intelligently determine when a response should be provided. In one embodiment, this can occur by monitoring whether data such as voice is coming over the communications line from an entity such as entity 114. For example, communications device 112 may monitor for the beginning and stopping of a person's voice. In such an example, it can be determined that the cessation of the person's voice indicates the end of the first stimulus. Accordingly, first response to the first stimulus can be provided. In such an embodiment, this may be a voice recording that says "option 3." In an alternative embodiment, it may correspond simply to providing an indication of a dialed digit or digits, such as "3."

Figure 2:
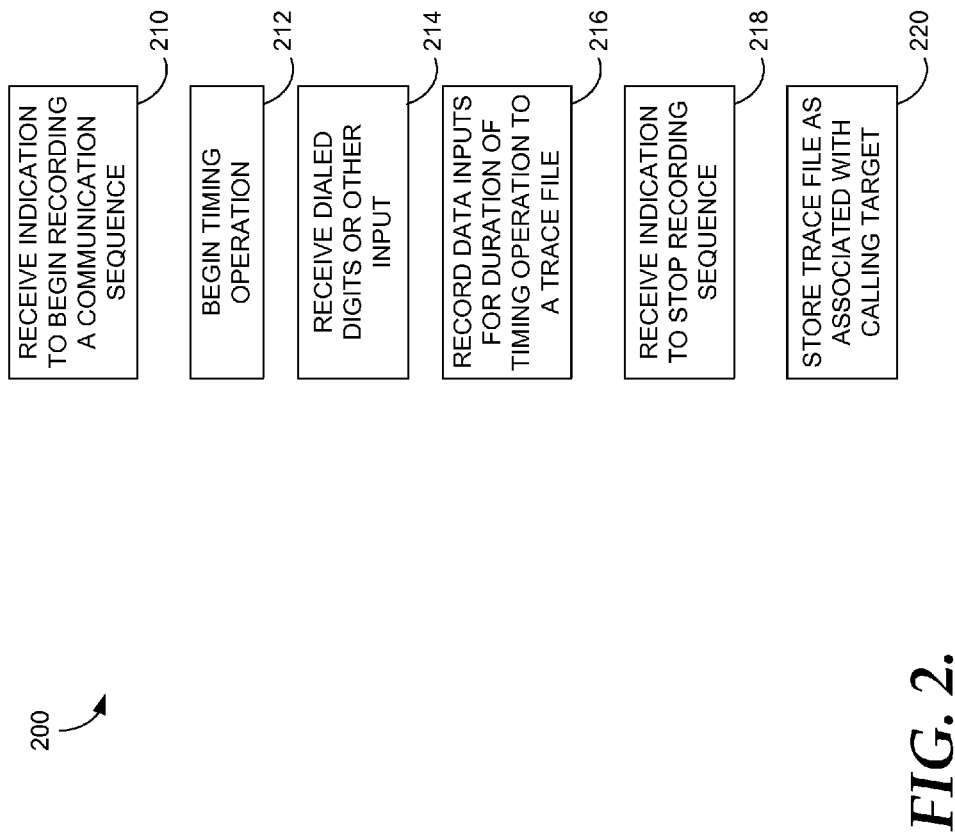
FIG. 2 depicts an illustrative method for recording an automatic-dialing process according to an embodiment of the present invention.

Turning now to FIG. 2, an illustrative method for practicing an embodiment of the present invention is provided and referenced generally by the numeral 200. Out of step 210, an indication to begin recording a communications sequence is received. This indication can take on a variety of forms. A first illustrative form may be a voice prompt provided by a user such as "begin recording." An alternative form of the indication to begin recording may come from a button press. In such an embodiment, a button may be provided on communications device 112 such that the pressing or depressing of the button starts a recording process. The button may also be a soft key, which may not be a dedicated button but can provide the start indication in at least one mode. The start indication may also come from a source remote from communications device 112. For example, in one embodiment a remote device, such as computer 124, may be used to initiate a recording sequence. Another illustrative form of the indication may be a voice call attempt after dialing a phone number. By preprogramming or user choices, device 112 may just record inputs from user end, but nothing from entity 114.

In one embodiment, a timing operation is begun at a step 212. The start of this timing operation corresponds to the reception of the start indication of step 210. In the embodiment of FIG. 2, input from the user will be stored according to a timeline. Thus, out of step 214, dialed digits and other user input are received. Dialed digits include digits on communications device 112 as well as other digits, such as alphanumeric characters inputted from computing device 124. Other forms of user input may include a voice stream, a picture, or a video stream.

Communications device 112 may be a multimedia communications device, such as a smart phone or the like, that if equipped with a camera affords a user the ability to take pictures as well as to record video or audio streams. Thus, a user could record a short audio clip that describes a desired function to be performed. For example, an illustrative audio clip may recite a person's name, or may recite a desired function such as "directions." Voice-recognition technologies continue to improve. The current state of the art offers voice-recognition technologies that are employed by many companies, especially large companies that invite callers to simply say a request, which can then be acted on. Accordingly, an embodiment of the current invention, which plays back a previously recorded audio stream that describes a desired function can be understood by an entity such as entity 114.

At a step 216, the data inputs and timing durations are stored. In an illustrative embodiment, the various types of input and their relative positions to each other are stored in a trace file. In some embodiments, actual data input is stored. In other embodiments, data suitable to reproduce received user input is stored. For example, compression techniques may be employed to reduce the size of files. In other embodiments, key presses of a certain input device may convey a certain type of information that should be stored in such a way so that it is reproducible in the future. For example, if a user employed a conventional computer keyboard to store dialed digits, then the digits may come through as ASCII code. But if telecommunication systems rely on a different mode of communication, such as DTMF (Dual Tone Multi Frequency) codes, then the DTMF codes will need to be reproduced during an automatic-dialing process. Thus, in one embodiment, the dial digits themselves may be stored. For example, the digits may simply be stored as numerals. And in such embodiments, if alternative protocols or forms of communication such as DTMF tones or certain types of packets in a packet-based communication systems need to be reproduced, then they can be reproduced during an automatic-dialing process. Similarly, in other embodiments, when DTMF tones or other codes are received, rather than actually storing the tones themselves, data corresponding to the tones will be stored. For example, if a person were utilizing a conventional analog telephone device that did employee DTMF tones, then numerals corresponding to those tones could be stored instead of the actual tones in that embodiment.

At a step 218, an indication to stop the recording sequence is received. This indication may be received by a user or it may be received by another entity. For example, an indication to stop a recording may include an off-hook or an on-hook indication that indicates a lost connection. A user initiating a call may have ended the call, or a party on the other end of the line may have ended the call. In still another embodiment, a stop indication may be predefined such that when it is recognized, the recording sequence stops. For example, a user may log in via computing device 124 to indicate that a given recording sequence is to stop once a certain prompt is recognized by a call entity such as entity 114. Thus, when a recording sequence starts, it will end incident to recognizing the prescribed prompt.

At a step 220, the trace file is stored. In one embodiment, it is stored associated with an identifier that is recognizable by a user. This would enable a user to recall the procedure and initiate an automatic-dialing or connection process according to the data saved in the trace file.

Figure 3A:
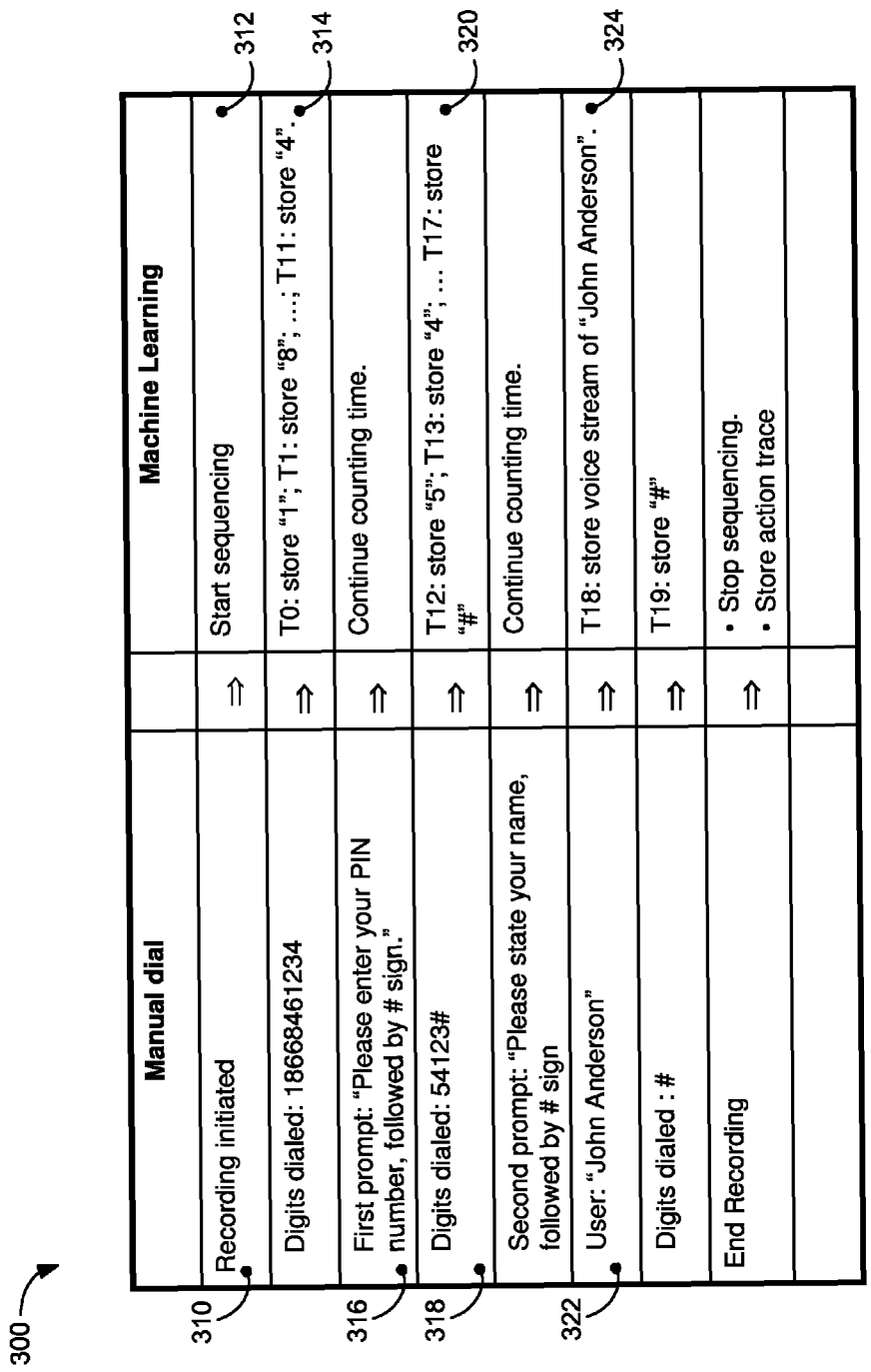
FIGS. 3A and 3B depict illustrative examples for storing information associated with facilitating an automatic-dialing process.

An illustrative embodiment consistent with the procedure of FIG. 2 is provided in the table of FIG. 3A, referenced generally by the numeral 300. The recording is initiated in box 310, which starts a learning sequence, indicated by box 312. In this illustrative embodiment, a set of digits such as "18668461234" are dialed. In one embodiment, at time T0 an indication of the "1" is stored, at time T1, data indicating the numeral "8" is stored. This process continues until all digits are stored, which is indicated by box 314. As shown in box 316, a first prompt such as "please enter your pin number followed by the # sign" may be recited from a called entity. Time continues to elapse.

More digits are dialed, such as "54123#" as shown in box 318. Box 320 indicates that at some indication such as time T12, "5" is stored and this process continues until the "#" sign is stored. In such an embodiment, the time gradations do not need to be the same. For example, T12 may be mapped to a certain time indication rather than a time indication itself. A second prompt such as "please state your name, followed by # sign" may then be recited in this illustrative embodiment. Time continues to count during this process and the user may recite "John Anderson," as indicated by box 322. Beginning at the correct time interval, denoted by "T18" the voice stream of "John Anderson" will be stored, which is represented by box 324. The # sign is pressed, and stored, and the recording ends. At this point, the sequencing has stopped and the action trace is stored.

Figure 3B:
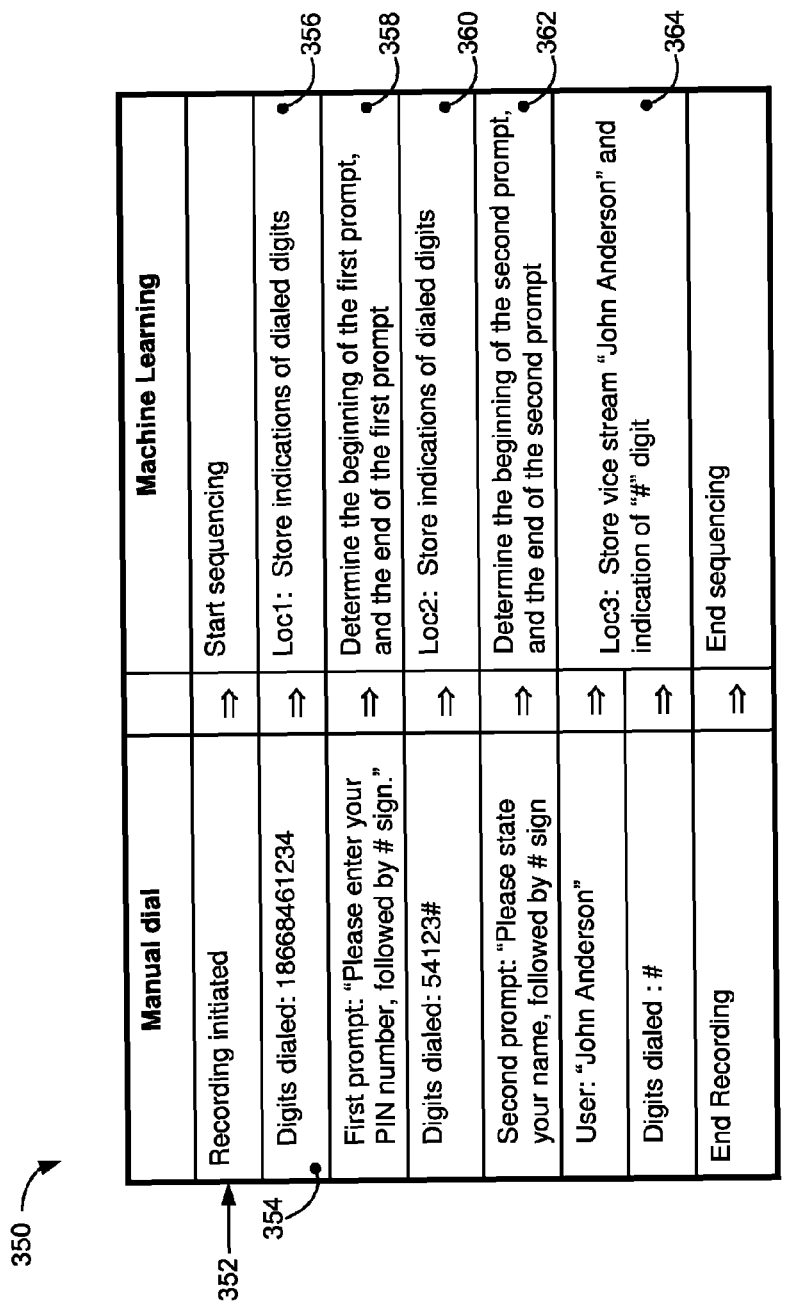

Turning now to FIG. 3B, an alternative method for practicing an embodiment of the present invention is provided and referenced generally by the numeral 350. In this embodiment, input received from the user is stored in specific locations that can be recallable in the future. In this embodiment, data necessary to complete a call is more compartmentalized. Recording is initiated and a sequence is begun as indicated by box 352. A set of digits may be dialed, such as "1866461234" as indicated by box 354. In this embodiment, the entire strain may be stored in one location, such as a field of an array. This is represented by box 356. The user may again be prompted to enter a pin number, and in this embodiment of the present invention, a determination can be made as to when the prompt begins and when the prompt ends. This is indicated by box 358. More dialed digits can be received and stored in a second location, as shown in box 360. Incident to receiving a second prompt, the beginning and ending of which can be determined (box 362), user input may be stored in a third location as shown in box 364. When an indication to stop recording is received, the sequencing stops.

Figure 4:
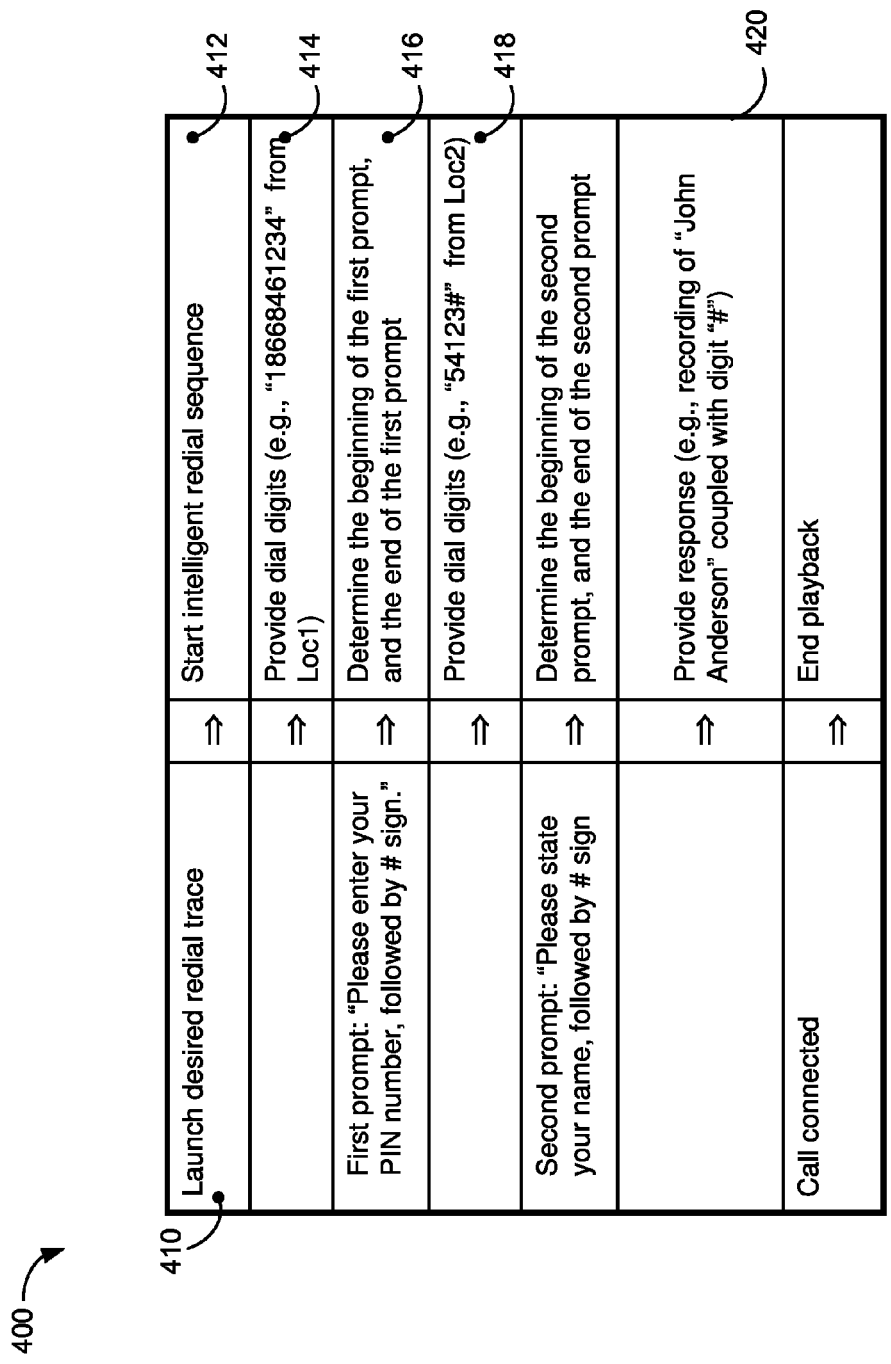
FIG. 4 depicts an illustrative example of facilitating an automatic-dialing process.

Turning now to FIG. 4, an illustrative method for facilitating an automatic-dialing process is provided and referenced generally by the numeral 400. As indicated by box 410, a desired redial trace is launched. This process may include navigating to a screen that lists identifiers associated with an automatic-calling process that can be selected by a user. Box 412 indicates a start of one embodiment of an intelligent dialing process.

Box 414 indicates that previously stored dialed digits (e.g., "18668461234") are provided. The example of FIG. 4 will minor the storage process of FIG. 3B. Accordingly, these dialed digits may be retrieved from a location, such as LOC1.

As the dialing process continues, a first prompt is provided from the called entity in this example. For example, the prompt may include "please enter your pin number, followed by pound sign." At a step 416, a determination is made as to the beginning and ending of the first prompt. Incident to the conclusion of the first prompt, a proper response to the prompt can be automatically provided without user intervention. For example, as indicated by box 418, data corresponding to dialed digits "54123#" can be automatically provided. In this example, a second prompt may request a person's name. A determination can be made as to the end of the second prompt, upon which a recording of "John Anderson" coupled with the "pound" sign can be provided, as indicated in box 420. Although not shown so as to not obscure the present invention, this process can continue for as long as is necessary. It may also be a much more complicated process than the simplistic example shown in FIG. 4. For example, a sophisticated called party may request authentication information such as a retina scan via a computer. Data corresponding to a photograph or other representation of such a retina scan can be automatically provided at the correct time. As many prompts as are provided, responses corresponding to those prompts can be automatically provided without user intervention.

Many useful applications of various embodiments of the present invention become apparent upon reading this disclosure. For example, people who need to contact their credit-card company and who want to be routed to a customer-service representative without manning the phone to manually navigate a phone tree or provide voice prompts can do so even if the time between providing the various voice prompts varies with each call. Another illustrative benefit of the present invention can be to facilitate an intelligent redial process if a caller is disconnected from a call that required a series of steps to connect. For example, consider the situation where a user may be part of a conference call that required responding to multiple prompts such as user names and meeting identifications in order to connect to a meeting. An aspect of the present invention includes automatically confirming that a person is connected to a call, and if he or she is not, then automatically facilitating a redial process.

Figure 5:
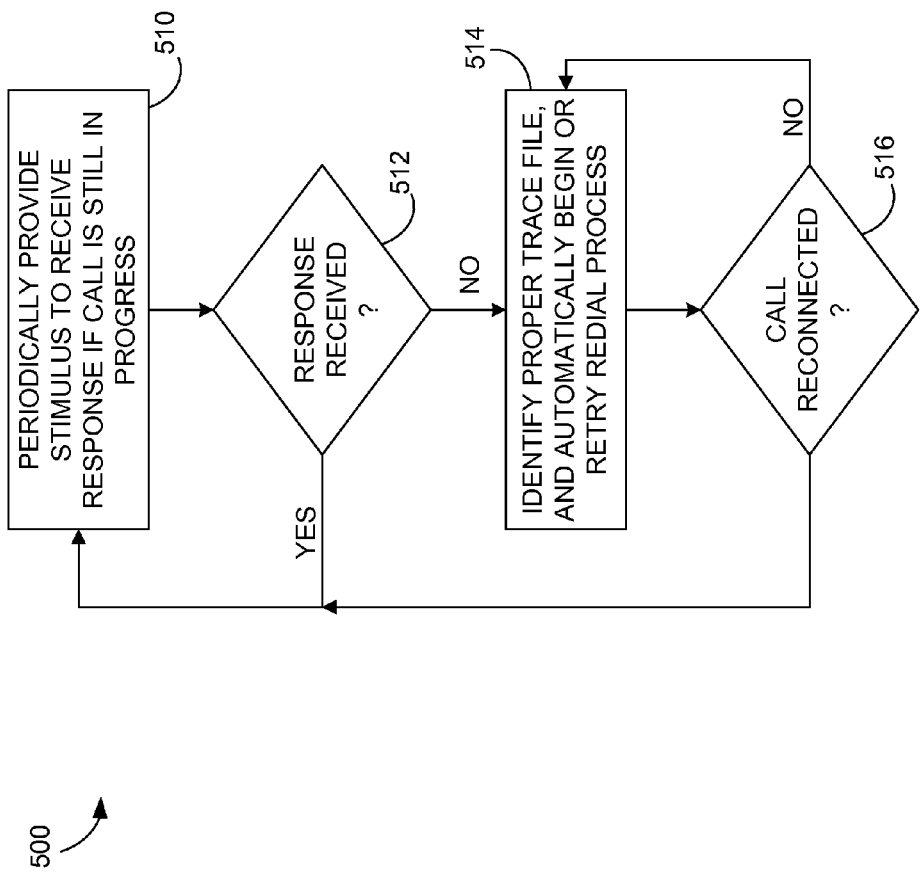
FIG. 5 depicts an illustrative method for automatically reconnecting to a party after automatically determining a connection was lost.

Turning now to FIG. 5, an illustrative embodiment of insuring that a person is still connected to a conference call, and reconnecting if the person is dropped is provided and referenced generally by the numeral 500. Calling device 112 checks to ensure that it is still connected to the call. Although this seems to be an unnecessary step inasmuch as a person on a conference call should know whether or not he or she has been disconnected, it is sometimes the case that the speaking party does not realize that he or she has been disconnected.

The process of confirming that communications device 112 is still connected to the call may be accomplished in a variety of ways. In a first illustrative way, communications device 112 may periodically provide a stimulus that contemplates a response if the call is still in progress. This is represented by step 510 of FIG. 5. At a step 512, a determination is made as to whether a response was received from the stimulus of step 510. If a response was received, then processing reverts to step 510, where later, another stimulus will be provided. But if a response is not received, then processing advances to a step 514, wherein a proper trace file is identified to facilitate an automatic redial process. An illustrative automatic redial process (which can include just a dialing process) was provided with reference to FIG. 4. At a step 516, a determination is made as to whether the call was connected. If it was not, then the redial process can be tried again at a step 514. And if it was connected, then processing can revert to step 510 so that the connection can be persistently checked.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for facilitating a method of automating a call process, the method comprising:

receiving a start indication to start recording events associated with a process of initiating and placing an outgoing call by a user, wherein the start indication is provided by the user, and further wherein the start indication is provided locally or remotely;

starting a timing reference that tracks time from the beginning of the process;

receiving data associated with the events ("event data"), wherein the event data is provided by a user in response to the events as the events occur during the process of initiating and placing the outgoing call, wherein the event data includes a voice recording associated with one of the events, and wherein receiving event data provided by the user includes receiving one or more of data that indicates a series of dialed digits or a video recording;

storing information suitable to reproduce the received event data according to a timeline based on the timing reference, wherein storing the information includes storing a relative position of the event data on the timeline, wherein storing information suitable to reproduce the received event data includes one or more of:

(A) storing the event data, (B) storing a representation of the event data, and (C) storing an identifier that identifies the event data;

repeating the receiving step and the storing step until a stop indication to stop recording events is received, wherein stored information associated with multiple events is sequenced at time intervals according to the timeline such that the stored information is suitable to reproduce the received event data for automatically performing the process of initiating and placing the outgoing call, wherein reproducing the received event data includes reproducing the voice recording associated with the one of the events; and wherein when the outgoing call is connected, confirming that the outgoing call is still connected by periodically providing a stimulus that contemplates a response, wherein (A) when the response is received to the stimulus, periodically providing the stimulus until the outgoing call is ended by the user, and (B) when the response is not received to the stimulus, determining that the user is prematurely disconnected from the outgoing call, identifying a proper trace file, and automatically facilitating a redialing process wherein the stored information suitable to reproduce the received event data for automatically performing the process of initiating and placing the outgoing call is used to automatically facilitate the redialing process.

2. The media of claim 1, wherein starting the timing reference includes starting a clock.

3. The media of claim 1, wherein storing information suitable to reproduce the received event data includes one or more of:

storing the event data;

storing a representation of the event data; and storing an identifier that identifies the event data.

4. The media of claim 1, further comprising receiving an automatic-dialing indication that initiates a redialing process.

5. The media of claim 4, wherein the redialing process includes retrieving the information stored in claim 1 to automatically contact an entity that normally requires user interaction without user interaction.

6. The media of claim 4, wherein the redialing process includes:

receiving an indication to begin a dialing process;

retrieving a first indication of an information-providing event associated with the dialing process, wherein the information-providing event corresponds to a previously-recorded event;

providing the event data associated with the previously-recorded event to satisfy the information-providing event;

determining whether a subsequent information-providing event is to be expected;

waiting for a correct time to provide additional data to satisfy the subsequent information-providing event;

providing additional data to satisfy the subsequent information-providing event; and repeating the determining, waiting, and providing steps until the call is connected or until there is no additional data to provide.

7. An electronics device that utilizes the media of claim 1 to facilitate a method of automating a call process.

8. An electronics device that utilizes the media of claim 6 to facilitate an automatic-dialing process.

9. One or more non-transitory computer-readable media having computer-useable instructions embodied thereon for facilitating a method of automating a call process, the method comprising:
  receiving an indication to start recording events associated with a call process of initiating and placing an outgoing call by a user, wherein the indication to start recording events is provided by the user, and further wherein the indication is provided locally or remotely;
  recognizing:
    (A) a time duration free from a prompt from a called entity, as well as from user input,
    (B) user input, wherein the user input includes receiving one or more of data that indicates a series of dialed digits or a video recording, and
    (C) a prompt received from a called entity for user input, wherein the prompt is recognized based on data received from the called entity;
  when the time duration is identified, then storing an indication of the time duration;
  when the user input is received then storing an indication of the user input;
  when the prompt is recognized based on the data received from the called entity, then storing an indication that identifies the prompt as well as an indication of a response associated with the prompt;
  repeating the recognizing step until an indication to stop recording is received, wherein the stored indications are suitable for automatically initiating and placing the outgoing call, and wherein the indication to stop recording includes an input from the user or an indication that no more data can be accepted; and
  wherein when the outgoing call is connected, confirming that the outgoing call is still connected by periodically providing a stimulus that contemplates a response, wherein
    (A) when the response to the stimulus is received, periodically providing the stimulus until the outgoing call is ended by the user, and
    (B) when the response to the stimulus is not received, determining that the user is prematurely disconnected from the outgoing call, identifying a proper trace file, and automatically facilitating a redialing process wherein the stored indications suitable for automatically initiating and placing the outgoing call are used to facilitate the redialing process.

10. The media of claim 9, wherein the indication to start recording includes one or more of:
  a voice initiation; and
  feedback from a button press.

11. The media of claim 9, wherein the user input includes input received via one or more of:
  a keypad;
  a microphone; and
  a camera.

12. The media of claim 9, wherein the indication of the user input includes the user input.

13. The media of claim 9, wherein the indication to stop recording is provided by an entity other than the user.

14. One or more non-transitory computer-readable media having computer-useable instructions embodied thereon for facilitating a method of automating a call process by utilizing previous events associated with manually placing a call that have been recorded during a manual dialing process when the call was manually placed, the method comprising:
  receiving an indication to begin a dialing process that reproduces the manual dialing process, wherein the indication to begin the dialing process is provided by a user, and further wherein the indication to begin the dialing process is provided locally or remotely;
  accessing stored information that includes the previous events, wherein the previous events include actions and time durations that occurred during recording of the manual dialing process, wherein the time durations indicate relative positions of the actions along a timeline as they occurred during the manual dialing process, wherein the relative positions of the actions along the timeline are associated with information-providing events that are associated with the dialing process, and wherein the previous events include one or more of data that indicates a series of dialed digits or a video recording;
  retrieving a first indication of an information-providing event associated with the dialing process;
  providing one of the actions that is associated with the information-providing event to satisfy the information-providing event, wherein providing the one of the actions includes providing a previously-recorded voice response that was provided by a user during the manual dialing process;
  determining whether a subsequent information-providing event is to be expected;
  when the subsequent information-providing event is to be expected, retrieving one of the time durations from the set of stored information, wherein the time duration indicates an amount of time to wait before providing a subsequent action to satisfy the subsequent information-providing event;
  waiting for the amount of time to elapse;
  upon the amount of time elapsing, providing the subsequent action from the set of stored information to satisfy the subsequent information-providing event;
  without user interaction, repeating the determining, waiting, and providing steps until the call is connected or until there is no additional data to provide; and
  once the call is connected, confirming and periodically checking that the call is still connected, wherein confirming and periodically checking that the call is still connected includes:
    (A) periodically providing a stimulus, wherein if a response to the stimulus is received, then determining that the call is still connected; and
    (B) if the response to the stimulus is not received, then determining that the call has been prematurely disconnected, and identifying a proper trace file to facilitate an automatic redial process, wherein the stored information suitable for automatically initiating and placing the call is used to facilitate the automatic redial process.

15. The media of claim 14, wherein the information-providing event includes one or more of:
  a prompt for information;
  a time gap to receive dialed-digit information; and
  a secondary data that supplements the provided additional data.

16. The media of claim 14, wherein when the call becomes prematurely disconnected, automatically reconnecting to a disconnected party.

* * * * *